(12) United States Patent
Shaffer et al.

(10) Patent No.: US 7,809,390 B2
(45) Date of Patent: Oct. 5, 2010

(54) METHOD AND SYSTEM FOR PROVIDING INFORMATION ABOUT A PUSH-TO-TALK COMMUNICATION SESSION

(75) Inventors: Shmuel Shaffer, Palo Alto, CA (US); Dean M. Zanone, Norco, CA (US); Shah Talukder, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 1009 days.

(21) Appl. No.: 11/554,210

(22) Filed: Oct. 30, 2006

(65) Prior Publication Data
US 2008/0102869 A1 May 1, 2008

(51) Int. Cl.
H04B 7/00 (2006.01)
(52) U.S. Cl. .................. 455/518; 455/519; 455/416; 455/418; 455/3.05; 455/90.2; 379/202.01; 370/260
(58) Field of Classification Search .................. 455/518, 455/519, 416, 418, 41.2, 3.05, 90.2, 67.13, 455/509; 379/202.01, 88.19, 312; 370/260, 370/276, 395, 296, 352
See application file for complete search history.

(56) References Cited

U.S. PATENT DOCUMENTS

| | | | |
|---|---|---|---|
| 3,864,746 A | 2/1975 | Burgess | |
| 5,734,707 A | 3/1998 | El-Wailly | |
| 5,757,897 A | 5/1998 | LaBarbera et al. | |
| 5,938,721 A | 8/1999 | Dussell et al. | 701/211 |
| 6,014,086 A | 1/2000 | Miyashita | |
| 6,094,578 A | 7/2000 | Purcell et al. | 455/426 |
| 6,185,205 B1 | 2/2001 | Sharrit et al. | 370/389 |
| 6,233,315 B1 | 5/2001 | Reformato et al. | 379/88.01 |
| 6,430,602 B1 | 8/2002 | Kay et al. | 709/206 |
| 6,446,004 B1 | 9/2002 | Cao et al. | 701/213 |
| 6,477,150 B1 | 11/2002 | Maggenti et al. | |
| 6,484,033 B2 | 11/2002 | Murray | 455/456 |
| 6,650,902 B1 | 11/2003 | Richton | 455/456.3 |
| 6,678,613 B2 | 1/2004 | Andrews et al. | 701/213 |
| 6,775,689 B1 | 8/2004 | Raghunandan | 709/206 |
| 6,798,755 B2* | 9/2004 | Lillie et al. | 370/312 |
| 6,912,389 B2 | 6/2005 | Bright et al. | 455/433 |
| 6,928,294 B2 | 8/2005 | Maggenti et al. | 455/518 |
| 7,155,248 B2 | 12/2006 | Idnani | |

(Continued)

OTHER PUBLICATIONS

Shaffer, et al., U.S. Appl. No. 11/267,645, filed Nov. 4, 2005, Communication from the U.S. Patent Office dated Sep. 18, 2008.

(Continued)

*Primary Examiner*—Matthew D Anderson
*Assistant Examiner*—Shaima Q Aminzay
(74) *Attorney, Agent, or Firm*—Baker Botts L.L.P.

(57) ABSTRACT

A method for providing information about a push-to-talk communication session includes facilitating a push-to-talk communication session among a plurality of endpoints and receiving from a first endpoint of the plurality of endpoints a request for floor control comprising a request to transmit communications in the communication session. The method includes, in response to receiving the request for floor control, providing to the first endpoint a signal communication indicating a status message and that the first endpoint has been granted floor control in the push-to-talk communication session.

39 Claims, 2 Drawing Sheets

U.S. PATENT DOCUMENTS

| | | | |
|---|---|---|---|
| 7,170,863 B1 | 1/2007 | Denman et al. | |
| 7,433,680 B2 | 10/2008 | Jenkins et al. | |
| 2002/0075305 A1 | 6/2002 | Beaton et al. | 345/751 |
| 2002/0077136 A1* | 6/2002 | Maggenti et al. | 455/518 |
| 2002/0150091 A1 | 10/2002 | Lopponen et al. | |
| 2003/0063580 A1 | 4/2003 | Pond | |
| 2003/0224762 A1 | 12/2003 | Lau et al. | 455/412.2 |
| 2003/0224825 A1 | 12/2003 | Cox et al. | |
| 2003/0225589 A1 | 12/2003 | Eaton et al. | 705/1 |
| 2004/0190489 A1 | 9/2004 | Palaez et al. | |
| 2004/0204151 A1* | 10/2004 | Muthuswamy et al. | 455/567 |
| 2005/0054361 A1 | 3/2005 | Turcanu et al. | |
| 2005/0122923 A1 | 6/2005 | Jang et al. | |
| 2005/0122937 A1 | 6/2005 | Hart et al. | 370/335 |
| 2005/0124290 A1 | 6/2005 | Bostrom et al. | |
| 2005/0182816 A1 | 8/2005 | Lin et al. | 709/200 |
| 2005/0220079 A1 | 10/2005 | Asokan | 370/352 |
| 2006/0014498 A1 | 1/2006 | Yau et al. | 455/90.2 |
| 2006/0040689 A1* | 2/2006 | Yoon et al. | 455/518 |
| 2006/0056689 A1 | 3/2006 | Wittebrood et al. | 382/173 |
| 2006/0154681 A1 | 7/2006 | Park et al. | 455/518 |
| 2006/0168346 A1 | 7/2006 | Chen et al. | 709/246 |
| 2006/0229093 A1 | 10/2006 | Bhutiani et al. | 455/518 |
| 2006/0239235 A1* | 10/2006 | Oswal et al. | 370/338 |
| 2006/0270361 A1 | 11/2006 | Szymanski et al. | |
| 2006/0281471 A1 | 12/2006 | Shaffer et al. | 345/751 |
| 2007/0036100 A1 | 2/2007 | Shaffer et al. | 370/328 |
| 2007/0036118 A1 | 2/2007 | Shaffer et al. | 370/338 |
| 2007/0037596 A1 | 2/2007 | Shaffer et al. | 455/518 |
| 2007/0104121 A1 | 5/2007 | Shaffer et al. | 370/276 |
| 2007/0105578 A1 | 5/2007 | Shaffer et al. | 455/518 |
| 2007/0105579 A1 | 5/2007 | Shaffer et al. | 455/519 |
| 2007/0133435 A1 | 6/2007 | Eneroth et al. | 370/260 |
| 2007/0192428 A1 | 8/2007 | Goldfarb et al. | |
| 2007/0220169 A1 | 9/2007 | Silver et al. | 709/246 |
| 2008/0102869 A1 | 5/2008 | Shaffer et al. | 455/518 |

OTHER PUBLICATIONS

Shaffer, et al., U.S. Appl. No. 11/267,645, filed Nov. 4, 2005, Communication from the U.S. Patent Office dated Apr. 23, 2009.

Shaffer, et al., U.S. Appl. No. 11/267,693, filed Nov. 4, 2005, Communication from the U.S. Patent Office dated Feb. 26, 2008.

Shaffer, et al., U.S. Appl. No. 11/267,693, filed Nov. 4, 2005, Communication from the U.S. Patent Office dated Sep. 17, 2008.

Shaffer, et al., U.S. Appl. No. 11/388,461, filed Mar. 24, 2006, Communication from the U.S. Patent Office dated Oct. 30, 2008.

PCT Notification of transmittal of the International Search Report and the Written Opinion of the International Searching Authority, or the Declaration, mailed Feb. 10, 2009 in reference to PCT/US2006/041675 filed Oct. 26, 2006.

Unknown author, Motorola T8550RCAMO specification, 123 radios, Sep. 8, 2008 (2 pages).

Crawford, SX700R, CS online, Feb. 18, 2006 (5 pages).

Unknown author, NOAA Weather Radio All Hazards, National Weather Service, description of weather radio, Feb. 4, 2005 (4 pages).

Shaffer, et al., U.S. Appl. No. 11/388,461, filed Mar. 24, 2006, Office Action from the U.S. Patent and Trademark Office dated Sep. 16, 2009, 25 pages.

Shaffer, et al., U.S. Appl. No. 11/267,645, filed Nov. 4, 2005, Office Action from U.S. Patent and Trademark Office dated Sep. 30, 2009, 14 pages.

Communication from European Patent Office in The Netherlands mailed Sep. 30, 2009 regarding PCT/US2006/041675.

Dennis, Patrick; Draft of document entitled "Land Mobile Radio (LMR) Standing Operating Procedures (SOP);" Department of the Army, Fort Gordon, GA; 5 pages, Jan. 18, 2006.

Shaffer et al., U.S. Appl. 11/267,693, filed Nov. 4, 2005, Communication from the U.S. Patent and Trademark Office mailed Feb. 22, 2010.

Shaffer et al., U.S. Appl. No. 11/267,915, filed Nov. 4, 2005, Communication from the U.S. Patent and Trademark Office mailed Apr. 14, 2010.

Shaffer, et al., U.S. Appl. No. 11/267,645, filed Nov. 4, 2005, entitled *Method and System for Providing a Push-to-Talk Communication Session*.

Shaffer, et al., U.S. Appl. No. 11/267,693, filed Nov. 4, 2005, entitled *Method and System for Providing a Push-to-Talk Communication Session Using a Control Endpoint*.

Shaffer, et al., U.S. Appl. No. 11/267,915, filed Nov. 4, 2005, entitled *Method and System for Providing a Proxy Media Service*.

Shaffer, et al., U.S. Appl. No. 11/388,461, filed Mar. 24, 2006, entitled *Automatically Providing Announcements for a Push-to-Talk Communication Session*..

NetworkFirst Interoperability Solved, Data Sheet, M/A-COM, Inc., ECR-7018A, http://www.networkfirst.com/resources/pdf/NetworkFirstRevised5_03.pdf, 6 pages.

Network Solution:, Information Sheet, NetworkFirst, M/A-COM, Inc., http://www.networkfirst.com/features/solution, 2 pages.

It's Our Network That Makes The Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications http://www.jps.com/downloads/PDFS/acuupgrade.pdf, 4 pages.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages.

OnStar Technology, Information Sheet, OnStar Corp., http://www.onstar.com/us_english/jsp/explore/onstar_basics/technology.jsp, 3 pages.

Cisco Land Mobile Radio Gateway, Data Sheet, Copyright © 1992-2005 Cisco Systems, Inc. www.cisco.com, pp. 1-7.

Cisco IP Interoperability and Collaboration System, Q&A, Copyright © 1992-2005 Cisco Systems, Inc. www.cisco.com, pp. 1-4.

Cisco IPICS, Solution Overview, Copyright © 1992-2005 Cisco Systems, Inc., www.cisco.com/go/ipics (6 pages).

Matthews, Dr. J. W ., *A New Interoperability Paradigm, A Concept Proposal*, Worcester Polytechnic Institute, Mar. 2006 (15 pages).

Shaffer, et al., U.S. Appl. No. 11/388,461, filed Mar. 24, 2006, Communication from the U.S. Patent Office dated Jun. 1, 2009.

Shaffer, et al., U.S. Appl. No. 11/267,915, filed Nov. 4, 2005, Communication from the U.S. Patent Office dated Aug. 21, 2009.

Patent Cooperation Treaty, From the International Searching Authority, Invitation To Pay Additional Fees and, Where Applicable, Protest Fee in International Application No. PCT/US2006/041675, dated Dec. 10, 2008, 2 pages.

\* cited by examiner

METHOD AND SYSTEM FOR PROVIDING INFORMATION ABOUT A PUSH-TO-TALK COMMUNICATION SESSION

TECHNICAL FIELD OF THE INVENTION

This invention relates in general to communication systems and, more particularly, to a method and system for providing information about a push-to-talk communication session.

BACKGROUND OF THE INVENTION

Many public and private groups, such as security and safety personnel (e.g., police, fire fighters and ambulance drivers) use various different communication devices operating on various different communication networks. For example, many public service organizations, such as police, fire and emergency management team (EMT), utilize land mobile radios communicating through push-to-talk technologies. Each organization may have its own communication network and/or its own communications channel. However, communications among different endpoints of different networks such as endpoints of different police, fire or other security networks may present a challenge. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM, Motorola, EADS, and Cisco Systems.

In addition, many networks of public and private groups, such as security and safety personnel, utilize push-to-talk (PTT) technology to enable communications among members of a particular group. Groups members may communicate using push-to-talk endpoints, such as land mobile radios. Emergency Response Teams (ERTs) utilize PTT devices to facilitate their communication. The convergence of radio PTT and IP networks opens this traditional communication modality to a new wave of innovation. The vast amount of bandwidth enables new functionalities and makes it possible to present multiple channels and virtual talk groups (VTGs) to end users. For example, Cisco System's Interoperability and Collaboration System (IPICS) introduced the PTT Management Center (PMC) client which allows users to participate in up to eight simultaneous PTT sessions. This system will accommodate up to 50 parallel sessions (channels and VTGs). These sessions may involve different public or private agencies, each one with a different communication standard and varied level of security. These two new dimensions (new features and multiple channels) present system designers with a GUI/TUI real-estate challenge of conveying the new readily available information to the end user.

User interfaces of existing PTT devices is typically limited to signaling the status of the floor control. For example, military systems use the following conventions of "beeps" and "bonks:" three beeps after pressing a PTT button means the channel is available and the user may talk; a bonk, steady/broken after pressing the PTT button means the channel is not available; a steady bonk without hearing talking on the radio may mean that the user is out of range or that the talk group or radio is disabled; two beeps after a user releases the PTT button means the radio battery is low. Recording systems play a periodic "beep" to remind conference call participants that their discussions are being recorded. This solution is not practical in a PTT system that involves radios, because air time must be saved for important operation related communication.

SUMMARY

Particular embodiments provide a method and system for providing information about a push-to-talk communication session that substantially eliminates or reduces at least some of the disadvantages and problems associated with previous methods and systems.

In accordance with a particular embodiment, a method for providing information about a push-to-talk communication session includes facilitating a push-to-talk communication session among a plurality of endpoints and receiving from a first endpoint of the plurality of endpoints a request for floor control comprising a request to transmit communications in the communication session. The method includes, in response to receiving the request for floor control, providing to the first endpoint a signal communication indicating a status message and that the first endpoint has been granted floor control in the push-to-talk communication session.

The status message may comprise an indication that upcoming communications from the first endpoint will be recorded. The signal communication may comprise a speech communication. The speech communication may comprise the prompt "recording." The signal communication may comprise a first signal indicating the status message and a second signal indicating that the first endpoint has been granted floor control. The status message may comprise an indication that the communication session comprises at least one endpoint of a lower security level than the first endpoint. The plurality of endpoints may comprise endpoints of at least two different communication networks participating in a virtual talk group.

In accordance with another embodiment, a system for providing information about a push-to-talk communication session includes a processor operable to facilitate a push-to-talk communication session among a plurality of endpoints and an interface coupled to the processor and operable to receive from a first endpoint of the plurality of endpoints a request for floor control comprising a request to transmit communications in the communication session. The processor is further operable to, in response to receiving the request for floor control, provide to the first endpoint a signal communication indicating a status message and that the first endpoint has been granted floor control in the push-to-talk communication session.

Technical advantages of particular embodiments include systems and methods for providing information about a push-to-talk communication session that replace traditional PTT audible tones with meaningful prompts that inform users of system status. This information may be conveyed to users without consuming valuable air time. Particular embodiments replace the traditional PTT "beep" sound which signifies that the user has gained floor control with a meaningful message. In some embodiments, a prompt is used to inform a user that his conversation is being recorded. In some embodiments, a user may be informed that he is communicating in a virtual talk group that may include a mix of secure and unsecure channels or participants. In particular embodiments, rather than sounding the traditional "bonk" to a person who fails to gain floor control, the user may be informed of the identity of the speaker who currently has floor control. These embodiments enable additional, meaningful information to be conveyed to PTT users in the context of the current PTT environment.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
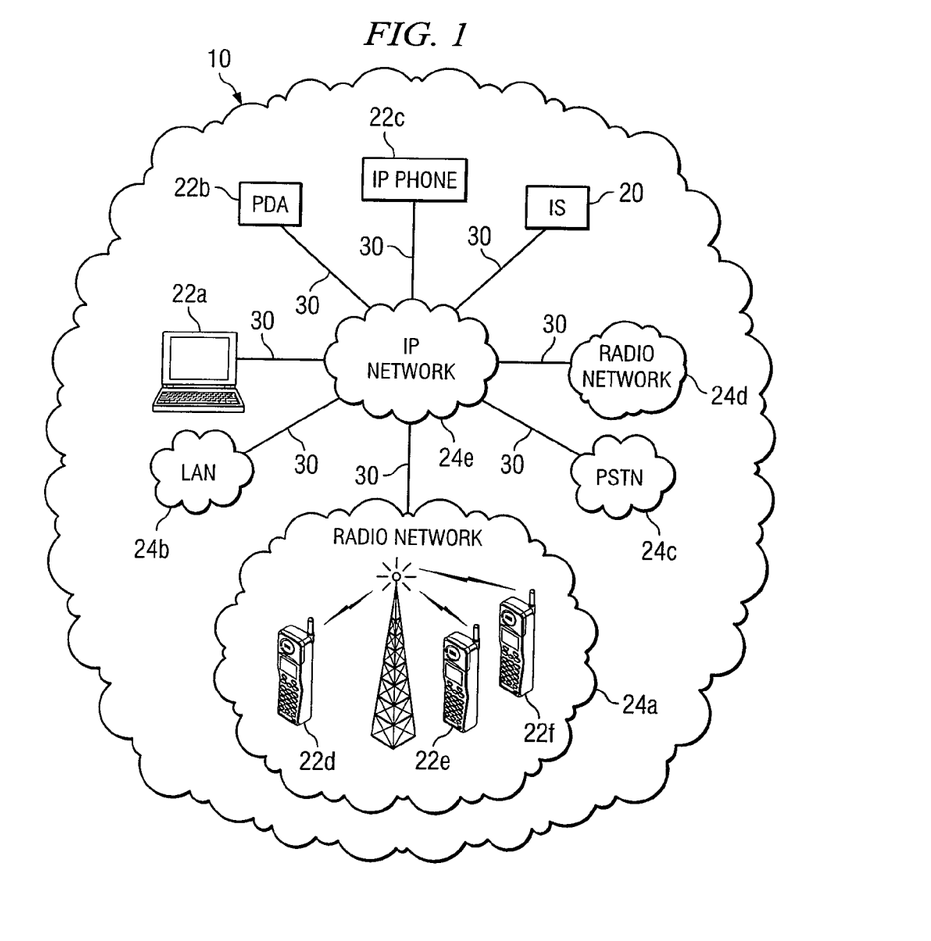
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22f. IS 20 is able to facilitate interoperable communication sessions between and among various communication devices, such as endpoints of communication networks 24 and endpoints 22. IS 20 uses a systems approach to offer a framework based on IP protocols and services to achieve secure voice, video and other data interoperability among communication endpoints and networks utilizing different technologies.

In particular embodiments, virtual talk groups (VTGs) may be formed to allow endpoints from different communication networks to communicate with one another as though they were part of the same communication network. A VTG may be formed in response to a particular situation (e.g., a fire) or to allow communication between endpoints of different functional groups within a particular working environment (e.g., different groups within a seaport). Multiple VTGs may be monitored by a dispatcher, foremen, operator, commanding officer or any other suitable user.

Some of the VTG participants may be communicating using an endpoint in a push-to-talk manner. The endpoint may be a land mobile radio, cellular phone, IP phone, PC, PDA or other communication device. Existing PTT communications convey various information through "beeps" and "bonks." For example, when a user of a PTT, half-duplex endpoint presses his "talk" (or PTT) button, he receives a "beep" to indicate that he has been granted floor control allowing his communications to be received by the other PTT endpoints communicating on the same channel. To convey to the user that he is denied floor control (after pressing his PTT button to request such floor control), the system may play a "bonk." Such denial may occur when another user has floor control.

Particular embodiments replace these traditional PTT audible tones with meaningful prompts that inform users of various system status issues. This information may be conveyed to users without consuming valuable air time. Particular embodiments replace the traditional PTT "beep" sound which signifies that the user has gained floor control with a more meaningful message. In some embodiments, a prompt is used to inform a user that his conversation is being recorded. In some embodiments, a user may be informed that he is communicating in a virtual talk group that may include a mix of secure and unsecure channels or participants. In particular embodiments, rather than sounding the traditional "bonk" to a person who fails to gain floor control, the user may be informed of the identity of the speaker who currently has floor control. These embodiments enable additional, meaningful information to be conveyed to PTT users in the context of the current PTT environment.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages.

Communication networks 24a-24e may include any number and combination of segments, nodes and endpoints to enable communication among network devices and components. Communication networks 24a-24e may be distributed locally or across multiple cities and geographic regions. Communication system 10 (including IS 20) may include any suitable number, type and/or combination of network components, gatekeepers, call managers, conference bridges, routers, hubs, switches, gateways (e.g., LMR and PSTN gateways), servers (e.g., multipoint conference servers), base stations, endpoints, firewalls, access points, processors, memory or other hardware, software or encoded logic to provide functionality described herein such as implementing any number of communication protocols that allow for the exchange of data in communication system 10.

Segments 30, which may comprise any suitable wireless or wireline communication links, including one or more communication networks (e.g., WANs) as appropriate, may couple various networks with each other and with endpoints 22 and IS 20. In particular embodiments, segments 30 may include gateways for facilitating communication between various networks, such as a land mobile radio (LMR) gateway between radio network 24a and IP network 24e.

In some cases, users of endpoints of one of communication networks 24a-24e may communicate with endpoints of another of communication networks 24a-24e through IS 20. IS 20 may facilitate the communication between endpoints of different networks by itself rebroadcasting the communications of one network to another network or IS 20 may cause other components which it can control to rebroadcast the communication. A radio network, such as radio network 24a or 24d, may support communication among portable mobile station endpoints, such as LMRs, using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. Such control may include the mapping of communications and endpoints to IP addresses for interoperable communication. In some embodiments, IS 20 may be viewed as a logical aggregation of functions that may be distributed throughout communication system 10. In some embodiments, IS 20 may host audio conferences that bridge communications received from endpoints. IS 20 is coupled to communication networks 24*a*-24*d* and endpoints 22 through IP network 24*e*, which may comprise any suitable IP network.

As indicated above, IS 20 uses IP to enable communication among endpoints of various networks. The endpoints of these various networks may not (without the aid of IS 20) normally be able to communicate with one another. The manner in which IS 20 facilitates communications among these endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a VTG for communication using a particular IP address. As an example, the VTG may be assigned a multicast IP address through which users of various endpoints may communicate on the VTG. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. Unless otherwise noted, participating in a VTG may include being able to both transmit and receive communications. IS 20 may control participation, for example, by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It should be noted that endpoints 22 and IS 20 may be any combination of hardware, software, and/or encoded logic that provides communication services to a user. In the illustrated embodiment, endpoints 22 comprise a PC (endpoint 22*a*), a personal data assistant (PDA) (endpoint 22*b*), an IP phone (endpoint 22*c*) and several PTT LMRs (endpoints 22*d*-22*f*). However, in other embodiments, endpoints 22 may include a telephone, a video monitor, a camera, a cell phone, a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24*a*-24*e*, the term "communication network" should be interpreted as generally defining any network capable of transmitting audio and/or video telecommunication signals, data, and/or messages, including signals, data or messages. Any one of networks 24*a*-24*e* may be implemented as a local area network (LAN), wide area network (WAN), cellular network, global distributed network such as the Internet, Intranet, Extranet, PSTN, LMR network, radio network (RN), CDMA network, GSM network, TDMA network, satellite network or any other form of wireless or wireline communication network.

Communications over communication networks 24*a*-24*e* may use any suitable communication protocol. In particular embodiments, some communication networks may employ voice communication protocols that allow for the addressing or identification of endpoints, nodes, and/or other components coupled to the communication network. For example, using Internet protocol (IP), each of the components coupled together by, for example, communication network 24*b* in communication system 10 may be identified in information directed using IP addresses. In this manner, network 24*b* may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24*b* may also be coupled to non-IP telecommunication networks, for example through the use of interfaces or components, including gateways. In the illustrated embodiment, communication network 24*b* may be coupled with PSTN 24*c* through a gateway. In some embodiments the gateway may be a part of IS 20 or network 24*e*. PSTN 24*c* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24*c*), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22*a*-22*c*, and endpoints and components of communication networks 24 may be IP telephony devices capable of participating in IM, video, and other multimedia communication sessions. IP telephony devices have the ability of encapsulating a user's voice (or other input such as video or IM) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
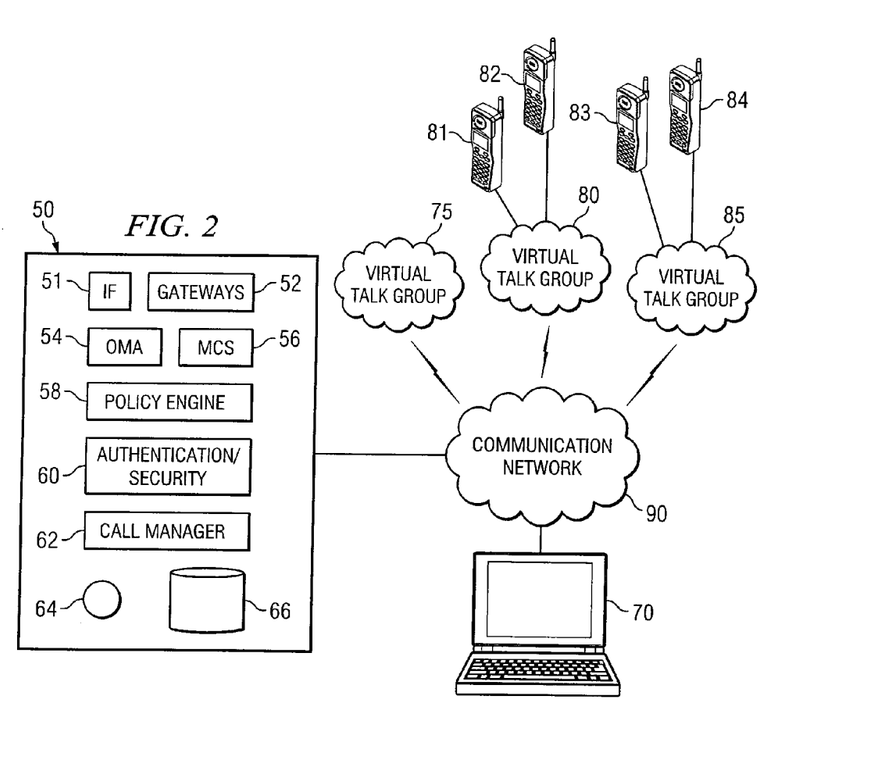
FIG. 2 illustrates an example interoperability system, in accordance with a particular embodiment.

FIG. 2 illustrates interoperability system (IS) 50, in accordance with a particular embodiment. IS 50 may be similar to and provide similar functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. In some embodiments IS 50 may be viewed as a logical aggregation of functions that may be distributed throughout communication network 90. IS 50 is coupled to PC endpoint 70 and VTGs 75, 80, and 85 via communication network 90. VTGs 75, 80, and 85 may comprise any number of endpoints utilizing any type of communication technology and/or channel. In the illustration, VTG 80 includes endpoints 81 and 82, and VTG 85 includes endpoints 83 and 84 participating in PTT communication sessions. Communication network 90 may include one or more of communication networks 24 depicted in FIG. 1. PC endpoint 70 may be used to access, configure and control various functionality provided by IS 50. PC endpoint 70 may run a client application for such access, configuration and control. The client application may enable a user of endpoint 70 to receive and monitor communications from various endpoints and virtual talk groups.

In particular embodiments, other types of endpoints may be utilized to access, configure and control IS 50, such as IP phones, web based thin clients, PDAs and mobile devices. IS 50 may be coupled to such endpoints (including PC endpoint 70) through one or more communication networks.

Interface 51 may be used in the communication of audio, video, signaling and other data between IS 50 and other network components. For example, interface 51 may receive communications from endpoints such as any of the endpoints of VTGs 75, 80 or 85 of communication network 90. The communication may take place, in whole or in part, over IP networks thereby negating the need for dedicated wiring between the endpoints and IS 50.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24*a* of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70 or another endpoint. In particular embodiments, OMA 54 may enable a user, such as dispatch personnel or administrators or a mobile user (e.g., a first responder mobile user) accessing IS 50 via a mobile endpoint, to configure, manage and participate in one or more virtual talk groups simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screen displays may include any number of functional controls to provide interoperable communications. In some embodiments, the screen displays may include listings or icons that may provide users with an indication that a prior communication has been detected. In particular embodiments, the dispatcher may be able to click on a particular listing or icon to communicate with the respective VTG. OMA 54 may authenticate a user and obtain user configuration information upon a user accessing the OMA. OMA 54 may monitor and provide communication ability for any number of channels and modalities at one time to provide the ability for an OMA user to communicate on and control multiple virtual talk groups at once.

Multipoint conference system (MCS) 56 provides collaboration and conference services for multiple endpoints of one or more networks. For example, users of multiple endpoints, such as LMRs of different networks (e.g., networks of different agencies or groups) and different types of endpoints of different networks, may be bridged together through MCS 56 to provide virtual talk group communications. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS. MCS 56 may include any suitable number or type of conference bridges, ports, digital signal processors or other components to facilitate communications discussed herein.

Policy engine 58 includes policies for undertaking various operations and functionality upon the occurrence of various events. These policies may include both pre-determined and ad hoc policies.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In some embodiments, the information about users is maintained within other components coupled to call manager 62 through, for example, network 90 so that call manager 62 may use the network to access the information about users. In particular embodiments call manager 62 may represent any appropriate combination of hardware, software and/or encoded logic distributed throughout a communication network coupled with an IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include the provision of a signal communication to an endpoint in response to receipt of a talk request signal from the endpoint. The signal communication from the processor may indicate that the first endpoint has been granted floor control in the push-to-talk communication session as is the case in typical PTT communications. The signal communication may also convey other information, such as a message that the endpoint user's upcoming conversations will be recorded or that the user is about to talk on a communication group with other users of a lower security level. In some cases, if the talk request signal is received when another user has floor control, the processor may provide a signal that informs the requesting user of the identity or other information of the user currently with control of the floor (e.g., the current speaker).

Memory module 66 may be any form of volatile or non-volatile memory including, without limitation, magnetic media, optical media, random access memory (RAM), read-only memory (ROM), removable media, or any other suitable local or remote tangible and non-transitory computer readable medium. Memory module 66 may store any suitable data or information, including software and encoded logic, utilized by IS 50. Memory module 66 may also store any other data that may be useful in implementing any of the features of particular embodiments. For example, in some embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711, G.729 or IMBE. Those audio samples may be packaged in standards-based real-time transport protocol (RTP) or real-time transport control protocol (RTCP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP or RTCP stream, such as an IP telephone or PC with appropriate software. The IP network and IP-enabled devices can be used to allow endpoints to monitor or transmit on a particular radio channel from a desk without issuing another radio.

As indicated above, Is 50 may facilitate communication among endpoints of various networks through virtual channels or VTGs. For example, a channel may comprise a unidirectional or bidirectional path for transmitting and/or receiving electrical or electromagnetic signals. This may comprise, for example, a conventional radio physical RF channel. In some embodiments, a VTG may be a subgroup of users who share a common functional responsibility and typically coordinate their actions amongst themselves without communicative interaction with other subgroups. For example, a building's security force network may include various endpoints that do not usually require radio connectivity with other functional groups but who are in constant communication amongst themselves, whether by radio, telephone or other forms of electronic communication. In particular embodiments a VTG may represent interoperability of a group of channels, and may include an associated virtual channel and an ID. Virtual channels may comprise an address, such as an IP address, associated with a VTG through which users may access the VTG and/or through which communications from VTG member-endpoints are bridged. Various types of VTGs may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

Any number of virtual talk groups may be configured to provide any suitable audio, data, video and control network interoperability. Virtual talk groups may be created using any suitable user/endpoint groups or channels based on location, organizational requirements, functional requirements, event requirements, or any other suitable characteristic. An administrator or operator may configure channel details such as name, description, participants, multicast IP addresses, codec and latch options through, for example, OMA 54.

As an example, a particular VTG may comprise any one or more of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. The VTG may also be configured by IS 50 through, for example, the use of OMA 54, policy engine 58, and processor 64, according to an organization's defined policies.

The following examples are presented to help in understanding the functionality of particular embodiments. For simplicity each example may combine only a few features together, though in practice particular embodiments may use some, all or none of the features in any of the examples discussed below. It should be noted that these examples are for illustrative purposes only and depict only some of the features and workings of particular embodiments. They are not intended to illustrate all features of all embodiments.

Particular embodiments expand upon existing audible tones used by PTT devices. In some embodiments, as an operator, dispatcher or any other authorized user selects to record a communication session (whether a channel, a VTG, or a VTG of VTGs) IS 50 sends an out-of-band indicator to each endpoint in the communication session to inform them that recording has been selected. In some embodiments, this signal communication may be received by software, such as a client application, running on the endpoints. For example, endpoint 81 may include such a client application. Thus, whenever a user of endpoint 81 presses a PTT button and gains floor control to speak on the communication session of VTG 80, rather than playing to him the "beep" used in conventional PTT sessions, endpoint 81 (through, for example, the client application) may play a more meaningful prompt, such as "recording." This prompt signifies to the user/speaker both that he has the floor and that his communication will be recorded, for example, by IS 50. If the floor is denied, the system may play the traditional "bonk" tone to the user.

As indicated above, the "recording" prompt may be played locally by a client application running on an endpoint of a user desiring to gain floor control. In this situation, the recording announcement may not consume any air time. In some situations, an endpoint may not be running a client application and air time may be consumed to convey the recording indication to the user.

Particular embodiments implement additional or other functionality to expand upon existing audible tones used by PTT devices. Some current systems that facilitate confidential communication channels (e.g., operated by the military and other organizations) prohibit the mixing of channels that operate at different security levels. For example, a communication sessions such as VTG 80 may only include endpoint users having a certain level of security clearance. In these systems other VTGs, such as VTG 85, may have users with a lower level of security clearance (e.g., users of endpoints 83 and 84).

In particular embodiments, IS 50 facilitates the marking of channels, VTGs or other communication sessions as secured (e.g., confidential). For example, in some embodiments when a dispatcher or other operator of OMA 54 desires to mix two channels or VTGs having users of different security levels (e.g., VTGs 80 and 85), OMA 54 may warn the dispatcher or operator of this fact. After warning the dispatcher that he is about to introduce an unsecured channel into a secured channel (and as a result create an environment of people with mixed security clearance levels), the dispatcher may be allowed to create a VTG of these two channels or VTGs. Then, IS 50 informs client applications running on endpoints of those involved in the VTGs about to me merged (e.g., endpoints 81 and 82) of the fact that the communication channel is about to include people who are not authorized to listen to confidential information. Whenever a user presses the PTT button on his endpoint 81 and gains floor control, rather than playing to him the traditional "beep," the client application may play, based on a communication from IS 50, a more meaningful prompt signifying the unsecured nature of the communication. The prompt may be "unsecured." This prompt signifies to the speaker both that he has the floor and that his voice is being heard by people without the same security clearance. If the floor is denied, the endpoint may play the traditional "bonk" tone to the user to indicate denial of floor control. In particular embodiments the "unsecured" prompt may be played locally at client applications in the endpoints. Some embodiments may include endpoints without client applications in which case air time may be consumed to convey the fact that the communication session is heard by people without the same security clearance.

Other embodiments include additional features to expand upon existing audible tones used by PTT devices. For example, some embodiments implement a speaker identification feature. As a user of endpoint 82 speaks, other users who are listening may desire to know the identity of the speaker. In these embodiments, a listener, such as a user of endpoint 81, may press the PTT button on his endpoint while the speaker is talking. The listener may know that he will not gain floor control at that time because floor control is currently in the hands of the speaker. Rather than playing the traditional bong sound (as would be played to indicate denial of floor control in this situation), endpoint 81 may "whisper" (e.g., using a low volume) to the listener "Joe has the floor" to convey to the listener that "Joe" is the current speaker. In particular embodiments, such speaker identification may be implemented through IS 50 and/or through a client application or other software running on the listener's endpoint. Other methods may also be used to indicate who is speaking, such as simply saying the speaker's name or making some other communication to convey the identity of the speaker to the listener. In some cases, conveying the identity of a speaker may simply mean conveying a rank, status, title and/or role of the speaker. In some embodiments, IS 50 may simply convey a message that indicates a type of endpoint used by the current speaker. This may in itself convey to the person pressing the PTT button information about the speaker (e.g., that the speaker is a police department speaker or another type of speaker).

Figure 3:
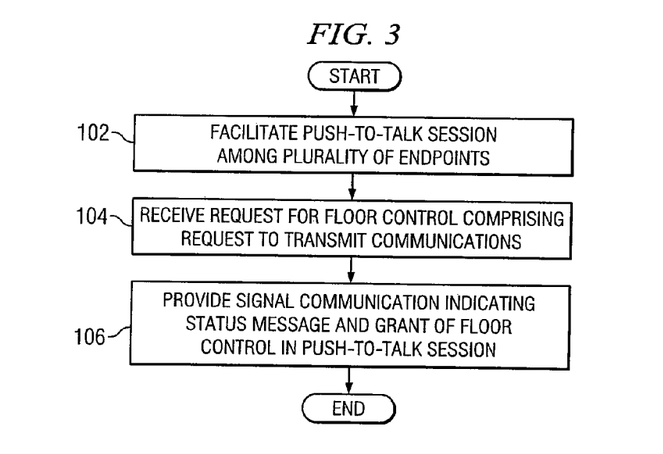
FIG. 3 illustrates a method for providing information about a push-to-talk communication session, in accordance with a particular embodiment.

FIG. 3 illustrates a method for providing information about a push-to-talk communication session, in accordance with a particular embodiment. At step 102, a push-to-talk communication session is facilitated among a plurality of endpoints. The PTT session may include endpoints of at least two different communication networks participating in a virtual talk group. In some embodiments, the PTT session may include endpoints of the same communication network. The session may be facilitated by an IS, such as IS 50 of FIG. 2.

At step 104, a request for floor control is received from a first endpoint of the plurality of endpoints. The request for floor control may be received by an interface of an IS. The request for floor control may comprise a request to gain floor control in order to transmit communications in the communication session, such as the typical transmission in a PTT session when a participant desires to talk (e.g., by pressing a PTT button or key).

At step 106, in response to receiving the request for floor control, a signal communication is provided to the first endpoint. The signal communication may indicate a status message and that the first endpoint has been granted floor control in the push-to-talk communication session. The signal communication may be provided by a processor of the IS. The first endpoint may include a client application to interpret the signal communication.

As indicated above, the signal communication may indicate that the first endpoint has been granted floor control in the session. This is similar to a typical PTT session. The signal communication may also indicate a status message, such as the upcoming communication from the user of the first endpoint may be recorded by the IS or that the user of the first endpoint is about to communicate in a session that includes users of other security levels. The signal communication may comprise a speech communication, such as the word "recording" or the word "unsecured," as applicable.

In some cases, the signal communication, when played by the first endpoint, may be a single message that conveys both the status message and that the first endpoint has been granted floor control. In other cases, the signal communication may include more than one signal, such as one indicating the status message (e.g., the prompt "recording") and another indicating that floor control has been granted (e.g., a chirp or beep). Other types of indicators may be used to convey the status message, such as a screen display, and LED or another endpoint component.

Other embodiments may include other steps, such as providing floor control to the first endpoint to enable a user of the first endpoint to communicate in the communication session, receiving from a second endpoint of the plurality of endpoints a request signal while the first endpoint has floor control and, in response to receiving the request signal, providing to the second endpoint a response communication indicating information associated with the first endpoint. Such information may include, for example, that identifying the current speaker (e.g., the current user of the first endpoint) or that identifying other information associated with the first endpoint such as its type (e.g., radio type, communication type, group type (e.g., police or fire department), etc.). Again, the information may be conveyed in any suitable manner, such as through speech, LED, screen display or other endpoint component. In addition, the information may be conveyed either as an in-band prompt (such as an in-band voice prompt) or as an out-of-band information element.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing information about a push-to-talk communication session, comprising:
   facilitating a push-to-talk communication session among a plurality of endpoints;
   receiving from a first endpoint of the plurality of endpoints a request for floor control comprising a request to transmit communications in the communication session; and
   in response to receiving the request for floor control, providing to the first endpoint a signal communication indicating a status message comprising an indication that the communication session comprises at least one endpoint of a lower security level than the first endpoint and that the first endpoint has been granted floor control in the push-to-talk communication session.

2. The method of claim 1, wherein the status message comprises an indication that upcoming communications from the first endpoint will be recorded.

3. The method of claim 2, wherein the signal communication comprises a speech communication.

4. The method of claim 3, wherein the speech communication comprises the prompt "recording."

5. The method of claim 1, wherein the signal communication comprises:
   a first signal indicating the status message; and
   a second signal indicating that the first endpoint has been granted floor control.

6. The method of claim 1, wherein the signal communication comprises a speech communication.

7. The method of claim 6, wherein the speech communication comprises the prompt "unsecured."

8. The method of claim 1, wherein the plurality of endpoints comprise endpoints of at least two different communication networks participating in a virtual talk group.

9. A system for providing information about a push-to-talk communication session, comprising:
   a processor operable to facilitate a push-to-talk communication session among a plurality of endpoints;
   an interface coupled to the processor and operable to receive from a first endpoint of the plurality of endpoints a request for floor control comprising a request to transmit communications in the communication session; and
   the processor operable to, in response to receiving the request for floor control, provide to the first endpoint a signal communication indicating a status message comprising an indication that the communication session comprises at least one endpoint of a lower security level than the first endpoint and that the first endpoint has been granted floor control in the push-to-talk communication session.

10. The system of claim 9, wherein the status message comprises an indication that upcoming communications from the first endpoint will be recorded.

11. The system of claim 10, wherein the signal communication comprises a speech communication.

12. The system of claim 11, wherein the speech communication comprises the prompt "recording."

13. The system of claim 9, wherein the signal communication comprises:
   a first signal indicating the status message; and
   a second signal indicating that the first endpoint has been granted floor control.

14. The system of claim 9, wherein the signal communication comprises a speech communication.

15. The system of claim 14, wherein the speech communication comprises the prompt "unsecured."

16. The method of claim 9, wherein the plurality of endpoints comprise endpoints of at least two different communication networks participating in a virtual talk group.

17. Logic embodied in a tangible and non-transitory computer readable medium, the tangible and non-transitory computer readable medium comprising code that when executed by a processor is configured to:
   facilitate a push-to-talk communication session among a plurality of endpoints;
   receive from a first endpoint of the plurality of endpoints a request for floor control comprising a request to transmit communications in the communication session; and
   in response to receiving the request for floor control, provide to the first endpoint a signal communication indicating a status message comprising an indication that the communication session comprises at least one endpoint of a lower security level than the first endpoint and that the first endpoint has been granted floor control in the push-to-talk communication session.

18. The medium of claim 17, wherein the status message comprises an indication that upcoming communications from the first endpoint will be recorded.

19. The medium of claim 18, wherein the signal communication comprises a speech communication.

20. The medium of claim 19, wherein the speech communication comprises the prompt "recording."

21. The medium of claim 17, wherein the signal communication comprises:

a first signal indicating the status message; and a second signal indicating that the first endpoint has been granted floor control.

22. The medium of claim 17, wherein the signal communication comprises a speech communication.

23. The medium of claim 22, wherein the speech communication comprises the prompt "unsecured."

24. The medium of claim 17, wherein the plurality of endpoints comprise endpoints of at least two different communication networks participating in a virtual talk group.

25. A system for providing information about a push-to-talk communication session, comprising:

means for facilitating a push-to-talk communication session among a plurality of endpoints;

means for receiving from a first endpoint of the plurality of endpoints a request for floor control comprising a request to transmit communications in the communication session; and means for, in response to receiving the request for floor control, providing to the first endpoint a signal communication indicating a status message comprising an indication that the communication session comprises at least one endpoint of a lower security level than the first endpoint and that the first endpoint has been granted floor control in the push-to-talk communication session.

26. A method for providing information about a push-to-talk communication session, comprising:

facilitating a push-to-talk communication session among a plurality of endpoints;

providing floor control to a first endpoint of the plurality of endpoints to enable a user of the first endpoint to communicate in the communication session;

receiving from a second endpoint of the plurality of endpoints a request signal while the first endpoint has floor control; and in response to receiving the request signal, providing to the second endpoint a response communication indicating information associated with the first endpoint, the information comprising at least an indication that the first endpoint is of a lower security level than the second endpoint.

27. The method of claim 26, wherein the information associated with the first endpoint comprises an identity of a user of the first endpoint.

28. The method of claim 27 wherein the response communication comprises a speech communication of a name of the user of the first endpoint.

29. The method of claim 26, wherein the information associated with the first endpoint comprises an identity of a type of the first endpoint.

30. The method of claim 26, wherein the request signal comprises a floor control request signal.

31. The method of claim 26, wherein the response communication comprises:

a first signal indicating the information associated with the first endpoint; and a second signal indicating denial of floor control to the second endpoint.

32. A system for providing information about a push-to-talk communication session, comprising:

a processor operable to:

facilitate a push-to-talk communication session among a plurality of endpoints; and provide floor control to a first endpoint of the plurality of endpoints to enable a user of the first endpoint to communicate in the communication session;

an interface coupled to the processor and operable to receive from a second endpoint of the plurality of endpoints a request signal while the first endpoint has floor control; and a processor operable to, in response to receiving the request signal, provide to the second endpoint a response communication indicating information associated with the first endpoint, the information comprising at least an indication that the first endpoint is of a lower security level than the second endpoint.

33. The system of claim 32, wherein the information associated with the first endpoint comprises an identity of a user of the first endpoint.

34. The system of claim 33 wherein the response communication comprises a speech communication of a name of the user of the first endpoint.

35. The system of claim 32, wherein the information associated with the first endpoint comprises an identity of a type of the first endpoint.

36. The system of claim 32, wherein the request signal comprises a floor control request signal.

37. The system of claim 32, wherein the response communication comprises:

a first signal indicating the information associated with the first endpoint; and a second signal indicating denial of floor control to the second endpoint.

38. Logic embodied in a tangible and non-transitory computer readable medium, the tangible and non-transitory computer readable medium comprising code that when executed by a processor is configured to:

facilitate a push-to-talk communication session among a plurality of endpoints;

provide floor control to a first endpoint of the plurality of endpoints to enable a user of the first endpoint to communicate in the communication session;

receive from a second endpoint of the plurality of endpoints a request signal while the first endpoint has floor control; and in response to receiving the request signal, provide to the second endpoint a response communication indicating information associated with the first endpoint, the information comprising at least an indication that the first endpoint is of a lower security level than the second endpoint.

39. A system for providing information about a push-to-talk communication session, comprising:

means for facilitating a push-to-talk communication session among a plurality of endpoints;

means for providing floor control to a first endpoint of the plurality of endpoints to enable a user of the first endpoint to communicate in the communication session;

means for receiving from a second endpoint of the plurality of endpoints a request signal while the first endpoint has floor control; and means for, in response to receiving the request signal, providing to the second endpoint a response communication indicating information associated with the first endpoint, the information comprising at least an indication that the first endpoint is of a lower security level than the second endpoint.

* * * * *